Aug. 11, 1970  J. J. CHISHOLM ET AL  3,523,748
IGNITION ASSEMBLY FOR BURNER FOR PHOTOMETRIC APPARATUS
Filed Feb. 20, 1967  8 Sheets-Sheet 1
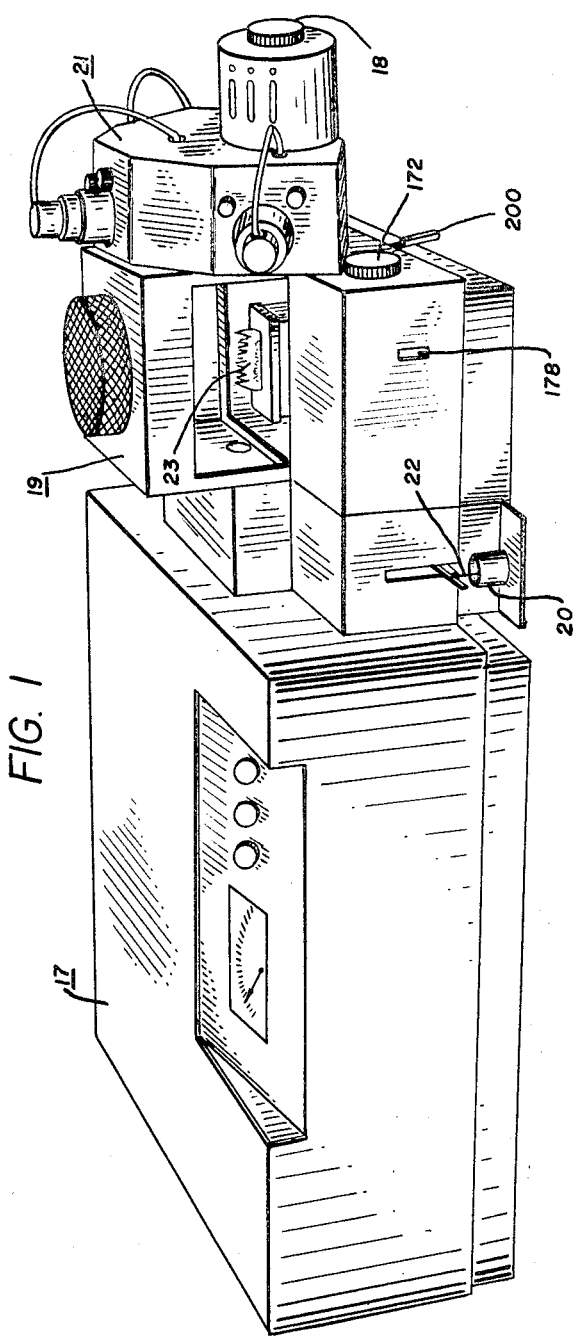
FIG. I
JAMES J. CHISHOLM
HENRY J. EMMEL
INVENTORS
BY *Charles C. Krawczyk*
ATTORNEY

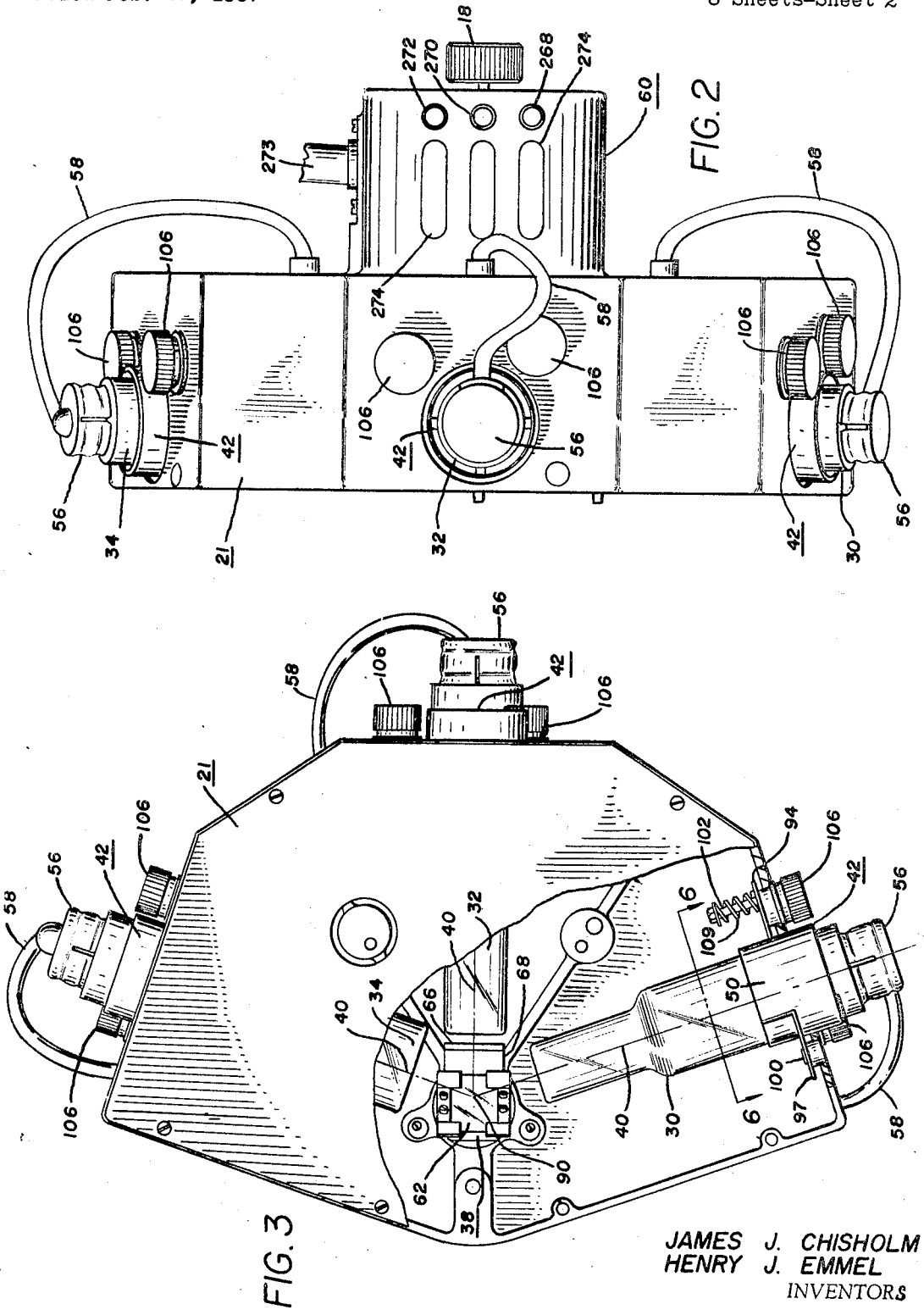

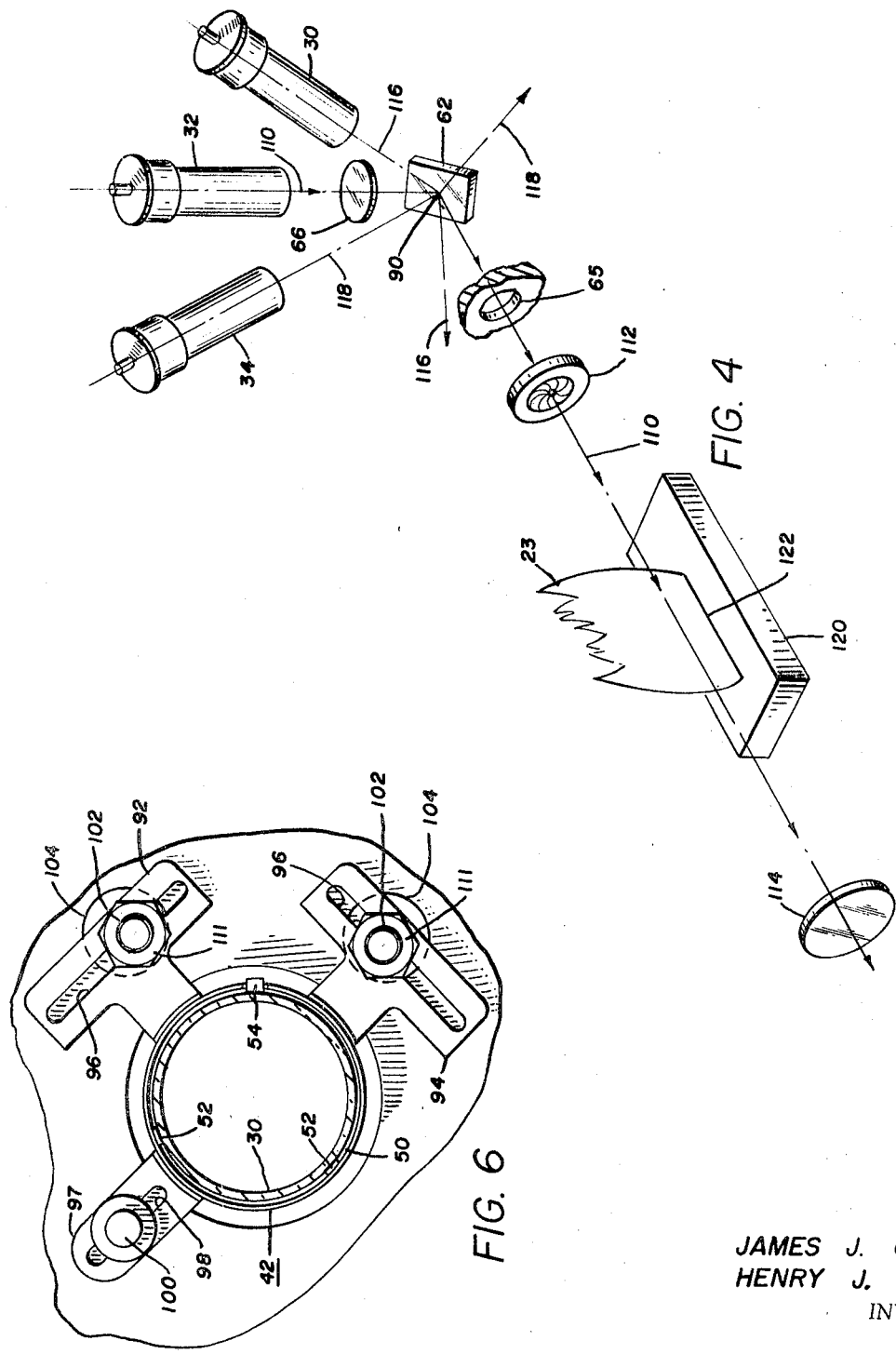

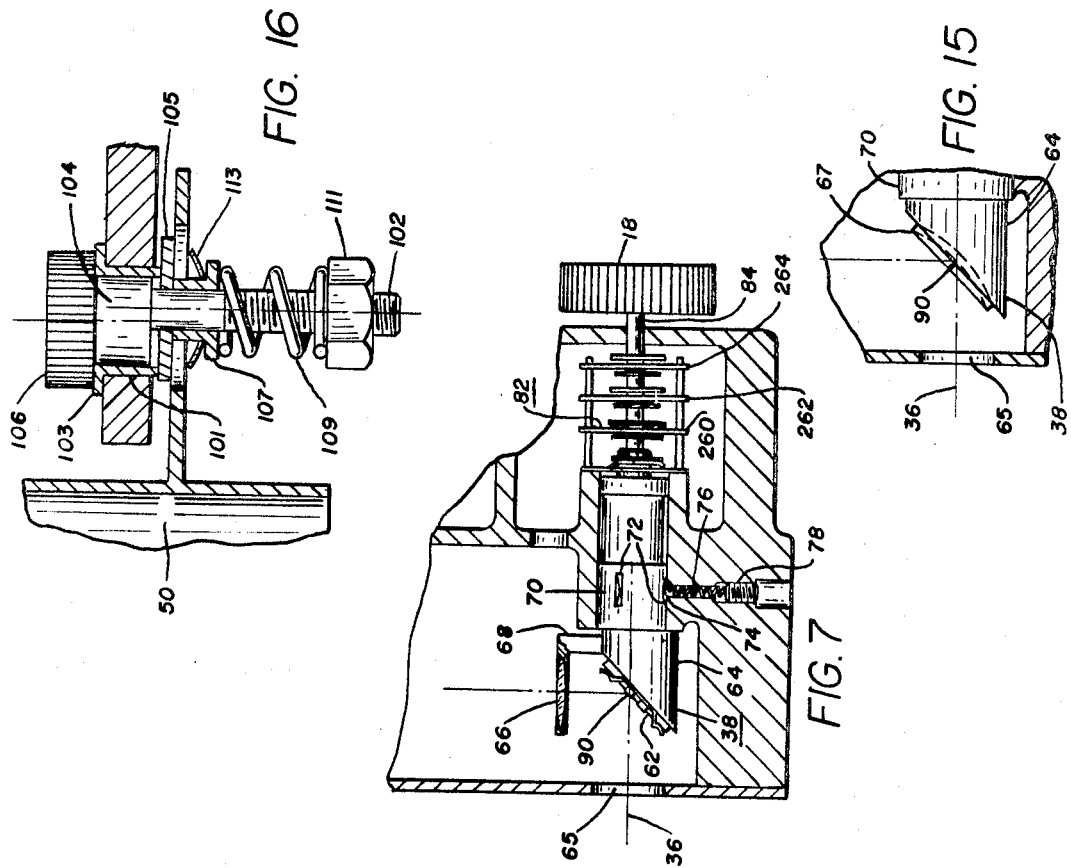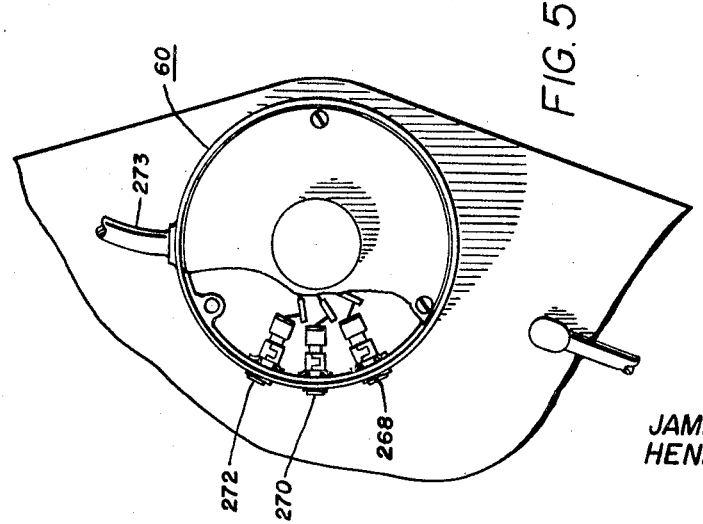

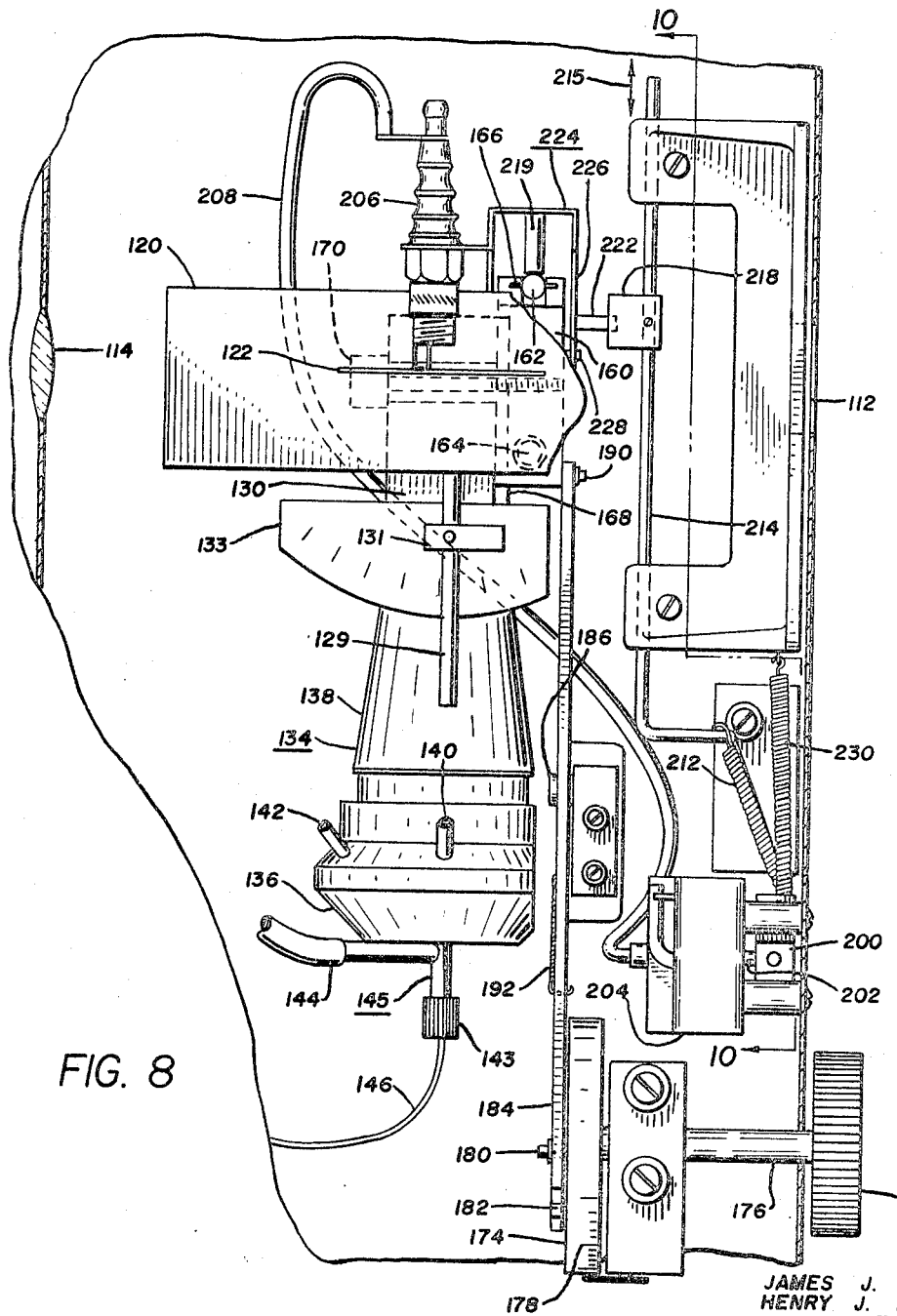

Aug. 11, 1970   J. J. CHISHOLM ET AL   3,523,748
IGNITION ASSEMBLY FOR BURNER FOR PHOTOMETRIC APPARATUS
Filed Feb. 20, 1967   8 Sheets-Sheet 6
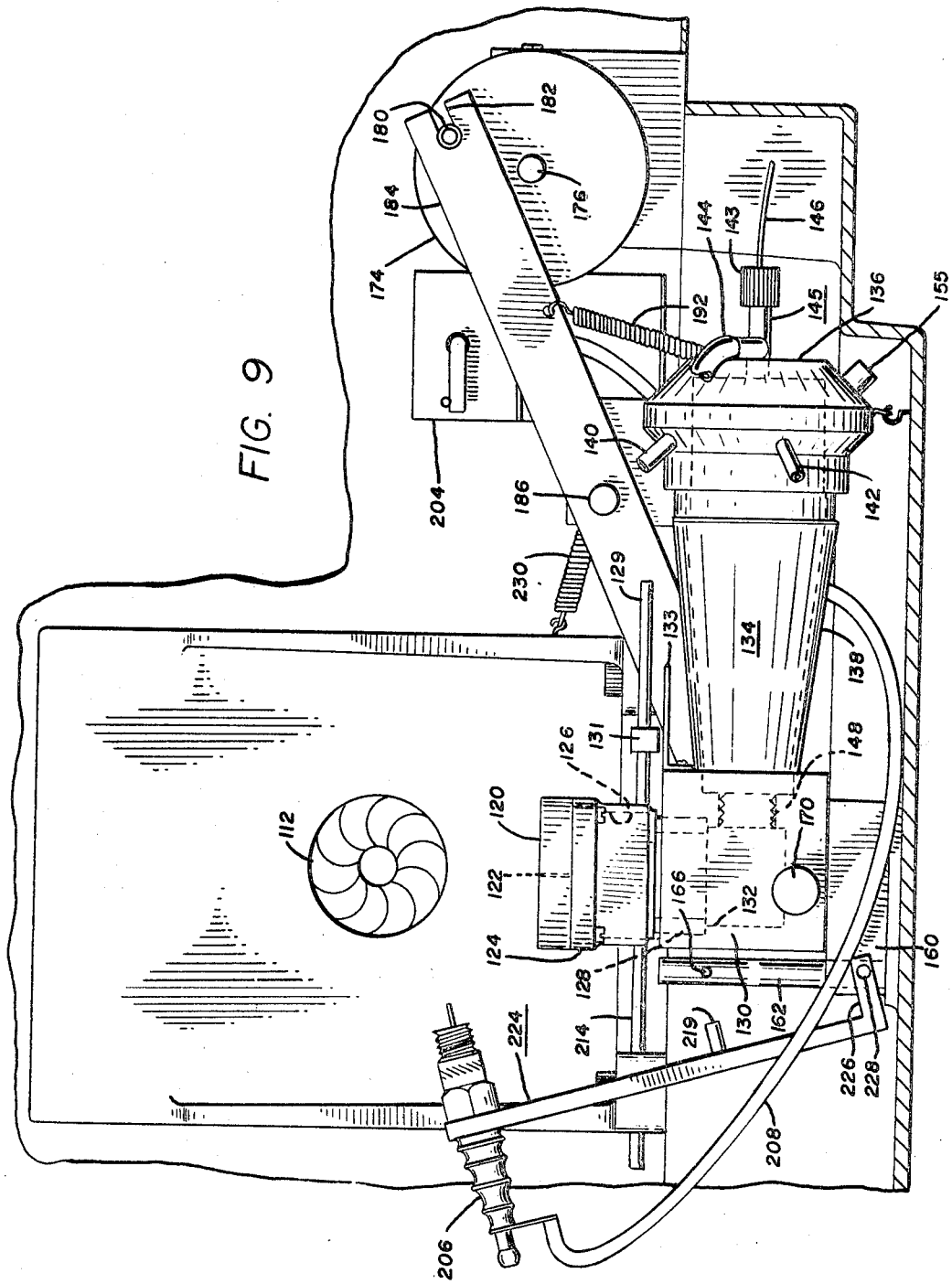
JAMES J. CHISHOLM
HENRY J. EMMEL
       INVENTOR.
BY Charles C. Krawczyk
ATTORNEY

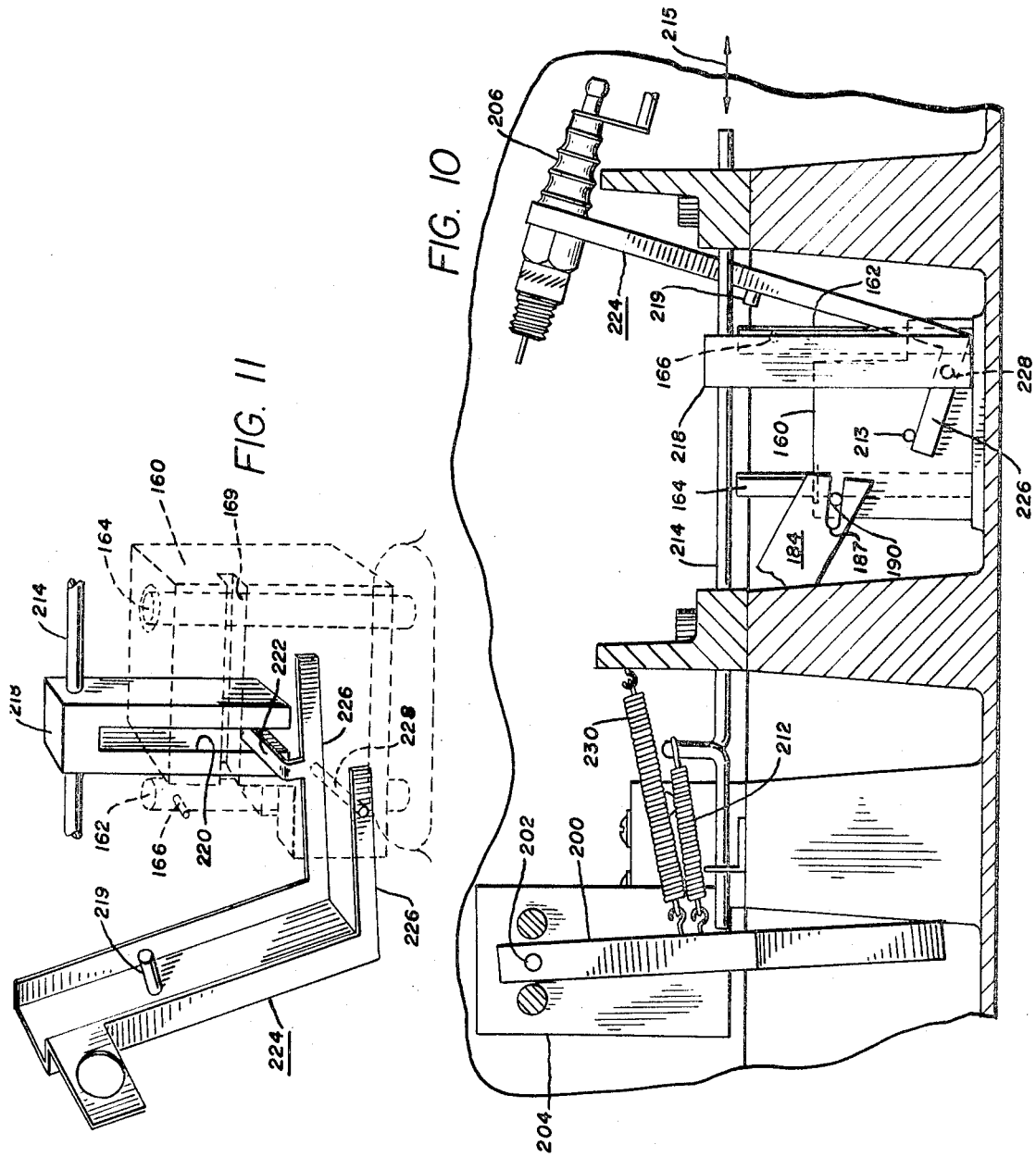

Aug. 11, 1970  J. J. CHISHOLM ET AL  3,523,748
IGNITION ASSEMBLY FOR BURNER FOR PHOTOMETRIC APPARATUS
Filed Feb. 20, 1967  8 Sheets-Sheet 8

JAMES J. CHISHOLM
HENRY J. EMMEL
INVENTORS

BY *Charles C. Krauzyk*

ATTORNEY

United States Patent Office 3,523,748
Patented Aug. 11, 1970

3,523,748
IGNITION ASSEMBLY FOR BURNER
FOR PHOTOMETRIC APPARATUS
James J. Chisholm, Rochester, and Henry J. Emmel,
Irondequoit, N.Y., assignor to Bausch & Lomb Incorporated, Rochester, N.Y., a corporation of New York
Filed Feb. 20, 1967, Ser. No. 617,103
Int. Cl. F23q 3/00
U.S. Cl. 431—264                                      4 Claims

ABSTRACT OF THE DISCLOSURE

A lamp housing and burner assembly is disclosed for use with photometric apparatus for determining and/or measuring the concentration of atoms by an atomic absorption phenomenon. A plurality of adjustable light sources emitting radiation that is characteristic of particular atoms are mounted in radial relation about an optical means. The optical means is adapted to select radiation from a particular source and to direct a beam of radiation through a flame zone of a burner into which a test solution is aspirated. The burner is a slot type burner that is rotatably, horizontally, and vertically adjustable to control the position of the flame through which the beam passes. An adjustable aspirator assembly is provided for the burner to control the aspiration efficiency. A piezoelectric ignition system is provided for the burner that automatically moves a spark device into and out of the flame zone while simultaneously generating a high voltage for creating the spark.

BACKGROUND OF THE INVENTION

This invention relates to optical illuminating and flame apparatus for photometric testing instruments.

In the atomic absorption phenomenon free atoms absorb radiation corresponding to their natural or resonance wavelength. In atomic absorption photometric apparatus a beam of radiation is applied to a substantially constant flame into which test samples are aspirated. The loss of intensity in the beam of radiation at the atomic resonance wavelengths provides a measurement proportional to the concentration of the particular atom in the sample.

If a single continuous spectrum radiation source is provided to cover the entire range of atomic resonance wavelengths, a very high resolution, high performance monochromator would be required to differentiate the various narrow bandwidths of the resonance wavelengths. In addition, a very high powered source would be required to provide sufficient output at the narrow bandwidths to provide a favorable signal to noise ratio. In most routine tests, a continuous source is not required since tests are made at specific wavelengths. It is therefore advantageous to use radiation sources, such as hollow cathode lamps, emitting radiation at only the particular atomic resonance wavelengths to be studied. Such lamps emit radiation corresponding to one atom (single element lamps) or discrete bands of resonance wavelengths corresponding to a number of atoms (plural element lamps).

In such photometric apparatus it is desirable to have a plurality of readily available discrete sources of the resonance wavelengths so that tests can be sequentially made on a single sample to determine the presence and/or concentration of a number of atoms, or a plurality of different samples can be tested for different atoms. Furthermore, it is desirable to have these sources in a steady-state operating condition so that the radiation from the sources can be applied to the flame zone without any warm up delay. If a plurality of lamps are to be employed, switching means should be provided to select the particular lamp providing the desired wavelengths with a minimum of adjustments. Preferably, the combination of the switching means and the lamps should be pre-adjusted so that any one of the plurality of lamps can be selected any number of times without requiring further adjustments. In addition to the foregoing, provisions should be made so that the various lamps providing radiation at these discrete bands of wavelengths can be simply interchanged.

For optimum sensitivity it is desirable that the beam of radiation be applied to the area or zone in the flame of maximum absorbance. The size of the area changes with the amount of test sample aspirated (lean vs. rich) and the environmental conditions through which it travels i.e. the type of fuel and the air-fuel ratio. It is therefore also desirable that the apparatus include an adjustable burner to control the position of its flame with respect to the beam of radiation from the source. In addition to the foregoing, since the test samples generally vary in viscosity it is desirable to include a readily available adjustment in the burner to control the aspiration rate and the droplet size for optimum sensitivity.

Since a relatively hot flame is required, and since an explosive mixture is present in the mixing chamber of premix type burners that may occasionally flash back (localized explosions), it is desirable to include a remotely controlled ignition system so that the operator can ignite the gas with a minimum of danger. Any such remote ignition system should be able to function continuously regardless of the adjustment made in the position of the burner. Also, the ignition apparatus must be removed from the flame after ignition to prevent burning of electrodes, contamination of the flame and optical interference.

BRIEF DESCRIPTION OF THE DRAWINGS

FIG. 1 is a perspective view of a spectrophotometer including the lamp housing and the burner assembly of the invention.

FIG. 2 is a top view of the lamp housing of FIG. 1.

FIG. 3 is a side view of the lamp housing assembly of FIG. 2 with a portion of a cover plate cut away.

FIG. 4 is an optical schematic diagram of the lamp housing and burner assembly.

FIG. 5 is an end view of a portion of the lamp housing assembly of FIG. 2 with a portion of a cover cut away to illustrate connections to the indicator bulbs therein.

FIG. 6 is a view of the lamp mounting means of FIG. 3 taken along lines 6—6.

FIG. 7 is a cross-sectional view of an embodiment of the optical switching assembly of FIG. 3.

FIG. 8 is a top view of a portion of the burner assembly of FIG. 1.

FIG. 9 is a side view of the burner assembly of FIG. 8.

FIG. 10 is a side view of the linkage for the ignition system of the burner assembly of FIG. 8 taken along lines 10—10.

FIG. 11 is a perspective view of a portion of the linkage of FIG. 10.

FIG. 15 is a second embodiment of an optical switching assembly for the lamp housing of FIGS. 3 and 7.

FIG. 16 is a cross-sectional view of an adjusting mechanism for the lamp mounting means of FIGS. 3 and 6.

SUMMARY OF THE INVENTION

Figure 12:
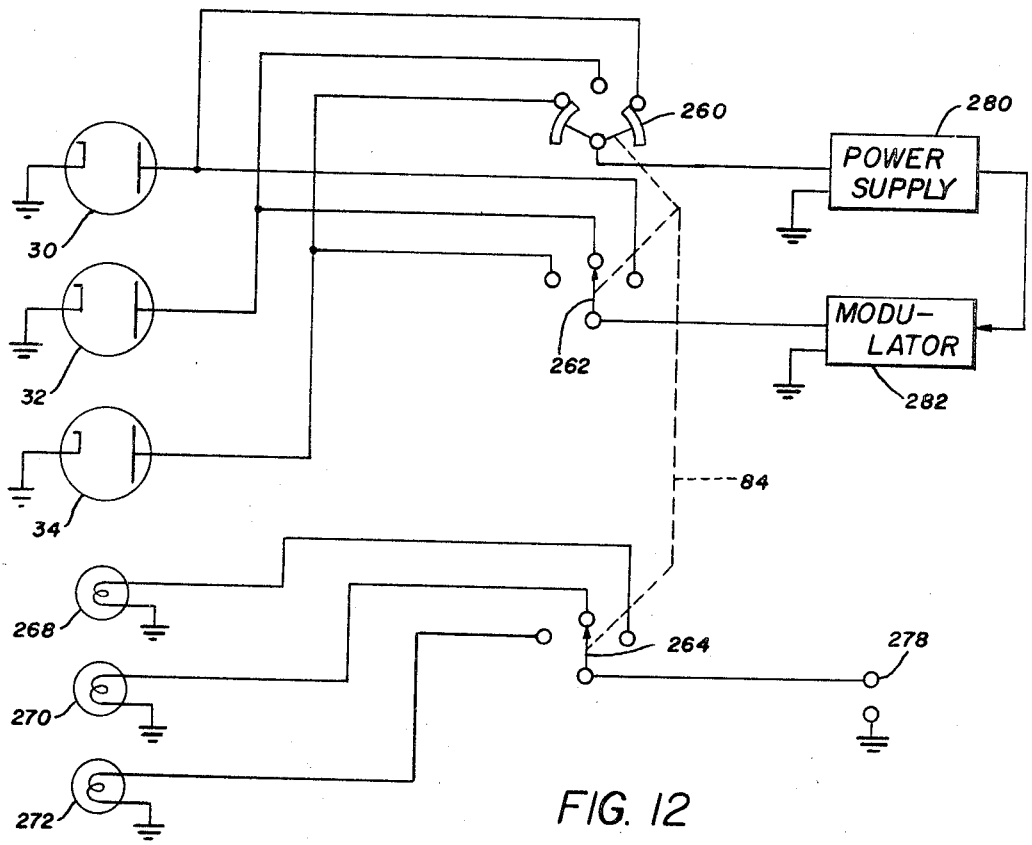
FIG. 12 is a schematic diagram of the electrical circuitry for the lamp housing.

The lamp housing of the invention includes a plurality of mounting means for receiving a plurality of radiation sources of different wavelengths, such as hollow cathode lamps, in a radial sequence about a point on an axis of a rotatable shaft. Optical means is rotatably coupled to the shaft for selectively receiving radiation from individual ones of said sources, and for directing radiation of the selected wavelengths along a predetermined path such as a test sample cuvette or a flame zone of a burner.

The preferred embodiment of the optical means includes a lens for directing radiation from the sources onto a mirror which in turn reflects the radiation along the predetermined path. Both the lens and mirror are coupled to rotate with the shaft.

A further feature of the lamp housing of the invention includes adjustment means for adjusting the position of the radiation sources in the radial direction and also in directions normal to the radial direction.

The burner assembly of this invention includes a piezoelectric ignition system. A spark device is movably mounted for movement into and out of the flame zone and is electrically coupled to a piezoelectric generator that generates a high voltage in response to a force applied thereto. A mechanical linkage is provided between a means for applying a force to the piezoelectric generator and the mounting means for the spark device so that the spark device is moved into the flame zone when a force is applied to generate the high voltage and is subsequently moved away from the flame zone when the force is removed.

The burner assembly of this invention also includes an adjustable aspirator sub-assembly for controlling the aspiration rate and droplet size. The aspirator sub-assembly includes a sample tube coaxially mounted within a second tube receiving a pressurized aspirating gas and forming an orifice type outlet with the second tube providing a venturi effect for aspirating a test sample into a burner mixing chamber for mixing with a combustion and supporting gas mixture. The position of the sample tube is axially adjustable so that the position of the end of the sample tube in the orifice outlet can be controlled for optimizing the aspiration rate of the test sample.

DESCRIPTION OF THE PREFERRED EMBODIMENT

The photometric apparatus of FIG. 1 includes a conventional single beam spectrophotometer 17 having attached thereto the burner assembly 19 and the multiple lamp housing 21 of the invention combined to provide an atomic absorption spectrophotometer. It is a well known phenomenon that atoms absorb radiation corresponding to their natural or resonance wavelength when they are freed from their chemical bonds by a flame. The amount of radiation absorbed at the resonance wavelengths provides an indication corresponding to the concentration of the particular atom in the test sample.

The lamp housing 21 provides a plurality of sources of radiation of various discrete bands of wavelengths. The particular band of wavelengths to be directed through a flame zone 23 is determined by the setting of a knob 18. A sample solution is aspirated from a cup 20 by an intake pick-off 22 into the flame zone 23. Absorption readings at the selected wavelengths are measured to provide an indication of the presence and/or concentration of the atoms in question.

The lamp housing 21, as fully illustrated in FIGS. 2–7, includes three cylindrically shaped hollow cathode lamps 30, 32 and 34 radially and normally displaced with respect to a reference line or axis 36 of an optical switching assembly 38 (FIGS. 7 and 15.) The hollow cathode lamps provide a spot or point type source radiation in the order of one eighth of an inch in diameter located approximately at the cylindrical axis of the respective lamps. Although only three lamps are illustrated, it should be noted that any number of such lamps can be included depending upon the size of the lamp housing employed.

The hollow cathode lamps are resiliently held in place by a lamp mounting assembly 42. The lamp mounting assembly 42 includes a cylindrical container 50 (FIG. 6) having a diameter slightly greater than that of the lamp. Each lamp mounting assembly 42 includes means for axially adjusting the position of the lamp including two plastic guides 52 and a spring clip 54. The hollow cathode lamps are slidably inserted into the cylindrical container 50 to the desired depth to provide the desired focal effect (as explained in a later portion of the specification) and will be retained at this position by the plastic guides 52 and resilient force of the spring clip 54. Electrical connections to the hollow cathode lamps are made through the use of the connectors 56 and the cables 58 which provide connections to an electrical switching assembly 60.

The embodiment of an optical switching assembly 38 in FIG. 7 includes a mirror 62 mounted on a rotatable base 64 to form an angle of approximately 45° with respect to the axes of the hollow cathode lamp and the reference line or axes 36, to direct a beam of radiation through an opening 65 in the lamp housing. Although the lamps are illustrated with their axis normally displaced with respect to the reference line or axes 36, it is to be understood that the lamps can be positioned along any transverse angle with respect to the axes 36 and the angle of the mirror 62 changed accordingly to direct the radiation along the reference line or axes 36. A focusing lens 66 is also mounted to the rotatable base 64 by an extension arm 68. The rotatable base 64 is coupled to a shaft 70 that is bearing mounted to the supporting structure of the lamp housing assembly for rotation about the reference line or axes 36. In the second embodiment of the optical switching assembly the mirror 62 and lens 66 are replaced by a single concave mirror 67 suitably mounted on the rotatable base 64. The mirror 67 also directs and focuses radiation from one of the lamps along the reference line or axes 36.

The shaft 70 includes three indentations 72 angularly spaced about its circumference corresponding to the angular spacing of the hollow cathode lamps. A detent ball 74 is resiliently urged against the shaft 70 through a spring 76 and a set screw 78 so that the optical switching assembly 38 is adapted to be detented at the three positions corresponding to the particular angles of the hollow cathode lamps.

The shaft 70 is coupled to a shaft 84 of an electrical wafer switch 82. The knob 18 is mounted on the end of the shaft 84. As the knob 18 is rotated, the electrical contacts on the wafer switch 82 apply a modulating potential to the selected lamp and a continuous potential to the other lamps so that all the lamps are continuously energized. The switching circuitry is explained at a later portion of the specification with regards to schematic diagram of FIG. 12.

Each lamp mounting assembly 42 includes means for adjusting the lamp in directions normal to its axis so that the radiation source in the lamps can be accurately aligned with respect to a position or point 90 on the reference line or axes 36. The mounting assembly 42 (FIG. 6) includes two T-shaped brackets 92 and 94 formed with elongated slots 96 and extend from the cylindrical container 50 at substantially right angles with respect to each other and the container. A third bracket extends from the cylindrical tube 50 at right angles with respect to bracket 92 and substantially in line with the bracket 94 having a slot therein parallel to the slot in the bracket 92. Although three brackets are illustrated, it is to be understood that other means for providing the three spaced slots, such as a circular disc surrounding the container 50, will serve the same purpose.

A pivot pin 100 extends through the slot 98 and mounts the bracket 97 to the supporting structure. Each of the brackets 92 and 94 are resiliently mounted to the supporting structure by a bolt 102 connected to a positioning knob 106 at one end, and offset coupled through a rotatable disc 104 to extend through the slot in the respective bracket. A first cylindrically shaped shoulder bushing 101 surrounds the disc 104 and has an extended tip portion 103 that engages the knob 106. A washer 105 is located between the bushing 101 and the bracket. A second shoulder bushing 107 surrounds the portion of the bolt 102 that passes through the slot in the bracket. A coil spring 109 is located between an adjustable nut 111 on the other end of the bolt 102 and the shoulder bushing 107. A spring washer 113 is located between the shoulder bushing 107 and the bracket to apply a substantially constant resilient force therebetween. The nut 111 is adjusted to provide a suitable friction force between the shoulder bushing 101 and the knob 106. The shoulder bushing 107 and the spring washer 113 exert a fixed force against the slotted bracket to provide a predetermined freedom of movement for the bracket, while the nut 111 and spring 109 control the torque required to rotate the knob 106. When a knob is rotated, the shoulder bushing 107 urges against the slot in the respective bracket to move the cylindrical container 50 in directions normal to the lamp axis 40, while the pressure of the spring 109 and nut 111 maintain the other knob substantially constant so that a single knob can be rotated independent of the other.

The operation of the optical switching apparatus 38 of the lamp housing is schematically illustrated in the optical diagram of FIG. 4. The lens 66 and mirror 62 are positioned to receive a beam of radiation 110 from the lamp 32 and direct the beam of radiation through the opening 65, an iris 112 in the burner assembly, the flame zone 23 and a relay lens 114, to the spectrophotometer 17. The beams of radiation 116 and 118 from the lamps 30 and 34 respectively (shown dashed) that impinge upon the mirror 66 are reflected in a direction other than through the opening 65 and therefore are not directed into the burner assembly. By simply rotating the lens-mirror combination, radiation from any of the lamps is individually directed through the flame zone.

The burner assembly is described with regards to FIGS. 8 and 9. The burner assembly includes a massive type burner having a thick steel head 120 with a long thin slot 122 formed therein. A steel casting manifold structure 124 is mounted to the head 120 having a chamber 126 therein and including a cylindrical extension 128 for receiving the combustible gas and supporting gas mixture and an aspirated test solution. The cylindrical extension 128 is bearing mounted in a cylindrical cavity in a mounting base 130 and is suitably sealed against leaks by an O ring. An extension handle 129 and an indicator 131 are mounted to the manifold 124 for rotating the burner head and manifold with reference to the mounting base 130. A scale 133 on the mounting base 130 provides an indication of the angular position of the burner slot 122 with respect to the beam of radiation 110. The mounting base 130 is formed with a passage 132 therethrough to provide the flow of gas into the manifold chamber 126.

Figure 13:
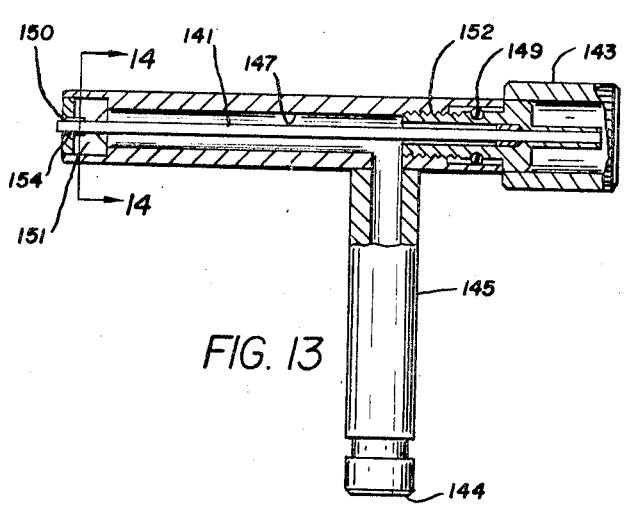
FIG. 13 is a cross-sectional view of the aspirator subassembly of the burner assembly of FIGS. 8 and 9.
Figure 14:
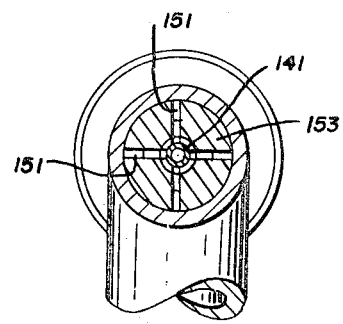
FIG. 14 is a cross-section of the aspirator sub-assembly of FIG. 13 taken along lines 14—14.

A mixing unit 134 is provided for premixing an aspirated test solution with a combustible gas and supporting gas mixture. The mixing unit 134 includes a cap 136 friction mounted and O ring sealed on an elongated hollow mixing chamber 138. Inlets 140 and 142 extend from on the cap 136 for receiving a combustible gas and combustion supporting gas respectively. A T-shaped aspirator connector or subassembly 145 is suitably mounted in the end of the cap 136 having an inlet 144 for receiving a pressurized aspirating gas and an inlet 146 for connection to a test solution to be aspirated. The T-shaped aspirator 145 (FIGS. 13 and 14) includes a narrow sample tube 141 that extends from within a knurled adjustment knob 143 coaxially through a gas passage 147 to an orifice outlet 150. The sample tube 141 is fixedly mounted to the knob 143 at the input end and bearing mounted to a collar 153 having four narrow gas passages 151 cut therein. The kob 143 has an extended portion 152 that makes adjustable threaded connection to the connector 145 for axial movement along the gas passage 147 and is sealed by an O ring 149. The aspirator gas inlet 144 is connected to the gas passage 147 so that the pressurized gas flows through the gas passages 147 and 151 and a cylindrically shaped passage 154 surrounding the end of the tube 141 creating a venturi type effect for aspirating the test solution from the sample tube 141 into the mixing unit 134. By simply rotating the knob 143 the position of the end of the sample tube 141 within the orifice is accurately adjusted to control the aspirator rate and droplet size thereby providing for optimum aspiration efficiency.

Since the gas mixture in the mixing chamber 138 is combustible, such premixed aspirator burners occasionally experience a flashback type of explosion. In the burner described, the cap 136 is generally forced off. To prevent any damage to the critical aspirator 145, the input end of the sample tube 154 is recessed within the knob 143 so that the substantially sturdier knob 143 takes the shock. Connection to the sample tube is made through an opening in the knob 143.

An outlet 155 (FIG. 9) extends from the bottom of the cap 136 for draining any drops of test solution that may have condensed on the inner portion of the mixing chamber 138. The mixing unit 134 is mounted to the mounting base 130 at a slight angle by a suitably sealed threaded connection on an extended portion 148 so that the gas and test solution flow to the burner through the passage 132 and any test solution condensed in the mixing chamber 138 flows toward the outlet 155.

The burner assembly is mounted for horizontal and vertical adjustable positioning so that the burner can be adjusted to have the beam of radiation pass through the zone of maximum absorption in the flame. The burner assembly is mounted to the supporting structure of the burner housing by a vertically adjustable mounting block 160. The mounting block 160 is slidably mounted to the supporting structure by a pair of vertically positioned pins 162 and 164 so that the block is free to move up and down. The pin 162 includes an extension arm 166 to limit the vertical travel of the block 160.

The mounting base 130 is coupled to the block 160 for adjustable movement in the horizontal direction. The mounting base 130 includes an elongated rib 168 (FIG. 8) that fits into a horizontal groove 169 (FIG. 11) in the mounting block 160 so that the mounting base 130 can be adjusted back and forth horizontally with respect to the beam of radiation. When the burner is located at the desired horizontal position, the mounting base 130 is secured to the mounting block by a screw 170.

The vertical position of the burner is controlled by a knob 172 through a lever mechanism coupled to the block 160. The knob 172 is connected to a wheel 174 through a shaft 176 mounted to the supporting structure of the burner assembly. A scale 178 is formed on the wheel 174 to provide an indication of the vertical position of the burner. A pin 180 extends from the wheel 174 and engages a slot 182 in a lever arm 184. The lever arm is pivotally mounted to the supporting structure by a pin 186. A slot 187 in the other end of the lever 184 engages a pin 190 in the mounting block 160 (FIG. 10). A spring 192 is coupled between the lever arm 184 and the supporting structure to act as counterbalance for the burner assembly. The shaft 176 is friction mounted to the supporting structure to provide a desired degree of friction so that as the knob 172 is rotated the block 160 (and also the burner assembly including the mixing unit) is moved vertically to the desired position and held at that position by the frictional force on the shaft 176.

A piezoelectric high voltage generator provides the source of power for the ignition system for the burner as illustrated in FIGS. 8–11. A lever type handle 200 is coupled through a shaft 202 to a commercially available piezoelectric spark generator 204 for applying a force for generating the voltage. The voltage is transmitted by the cable 208 to a spark plug 206 for creating a spark across its spark gap. A linkage is provided between the shaft 202 and the spark plug 206 so that in response to a first range of rotation of the handle 200 the spark plug is positioned in the flame zone over the burner (as illustrated in FIG. 8) and remains in that position for a second range of rotation of the handle. When the handle 200 is subsequently released the spark plug returns to the position away from the flame zone as illustrated in FIGS. 9 and 10.

The lever 200 is coupled by a spring 212 to a rod 214 that is bearing coupled to the mounting structure to slide back and forth in the direction of the arrows 215. An extension arm 218 is secured to the rod 214 and includes a groove 220 for receiving an extension finger 222 that is connected to an L-shaped mounting frame 224 for the spark plug 206. The lower legs 226 of the L-shaped frame 224 are pivotally coupled by a pin 228 to the mounting block 160 (shown in phantom in FIG. 11). When the handle 200 is pivoted by the operator in the first range of movement the rod 214 slides horizontally to pull the extension arm 218 towards the burner. This in turn causes the spark plug to pivot until a limit stop 219 engages the pin 162 to position the spark plug as shown in FIG. 8. The spring 212 allows a spark to be generated across the spark gap during the first range of movement while the spark plug is pivoting into place and during a second range of movement after the plug is positioned. A spring 230 is coupled between the handle 200 and the supporting structure to return the spark plug 206 back to the position to engage a limit pin 213 as illustrated in FIGS. 9 and 10 when the handle 200 is released. It should be noted that a single turn of the lever 200 by the operator positions the spark plug for ignition while also generating a high voltage. After the gas is ignited, the operator releases the lever 200 and the spark plug moves away from the burner preventing any damage to the plug by the flame.

Since the spark plug mounting frame 224 is pivotally mounted to the vertically movable block 160 the spark plug moves vertically along with the burner. The slot 220 in the extension arm 218 provides sufficient movement for the extended finger 222 so that the ignition system functions as previously described regardless of the vertical position of the burner.

The electrical switch assembly 60 includes the wafer switch 82 having three switch sections 260, 262 and 264 coupled to the shaft 84 and three indicator bulbs 268, 270 and 272. A cable 273 applies power to the switch assembly 60. The indicator bulbs extend through the switching assembly 60 in a row with each one adjacent to a marking pad 274. The pads 274 provide a means for designating the types of hollow cathode lamp included in the respective mounting assemblies 42. The stationary contacts of the wafer switch section 264 (FIG. 12) are connected to terminals of the indicator bulbs 268-272. The other terminals of the bulbs are grounded. The movable contact of the switch section 264 is connected to a terminal 278 adapted to be connected to a source of energizing potential.

Power for the hollow cathode lamps 30-34 is provided by a conventional power supply circuit 280 and a modulator circuit 282 (FIG. 12). Power from the power supply 280 is applied to the rotatable contact of the wafer switch section 260 and also to the modulator circuit 282. The output voltage from the modulator circuit is applied to a movable contact in the wafer switch section 262. The corresponding stationary contacts of the wafer switch sections 260 and 262 are connected to the respective anodes of the hollow cathode lamps 30-34. The cathodes of the hollow cathode tubes are grounded. The movable contacts of the wafer switch section 260 include two angularly spaced movable sections, each section being large enough to cover the gap between two stationary switch contacts. Accordingly, two hollow cathode tubes receive a continuous source of energizing potential from the power supply 280 while one of the lamps receives the modulating voltage and the wafer switch section 264 energizes the particular bulb corresponding to the lamp receiving the modulated potential. As previously mentioned, the switch shaft 84 is coupled to the optical switching assembly 38 so that as the shaft 84 is rotated to select a particular source of radiation, the modulating power is applied thereto and the respective indicator lamp is energized.

SUMMARY OF OPERATION

The radiating sources in the hollow cathode lamps are first positioned by rotating the knobs 106 so that the radiations from the lamps pass through the lens 66 (when selected) to impinge on the mirror 62 at substantially the point 90. This is observed by monitoring the photosensor current in the attached spectrophotometer 17 for a peak signal. The burner head 120 is now positioned parallel to the beam of radiation by the extension handle 129. The lamps are now axially adjusted in the mounting assembly 42 so that the lens 66 images the radiating source in the desired portion of the flame zone. The burner is now ignited by allowing the combustion gas and combusion supporting gas to flow into the mixing unit 134 and by pulling the handle 200 forward. As previously mentioned, the spark plug is automatically positioned over the burner head 120 to generate a spark and ignite the gas. The handle 200 is then released and the spark plug pivots away from the burner head. The vertical position of the flame is now adjusted by rotating the knob 172. The burner and lamp housing assemblies are preset for running atomic absorption tests on the test solutions to be aspirated into the flame zone. It should be noted that only a single element (the lamps themselves) requires adjustment for each individual hollow cathode lamp employed. Once the lamps are preset, selected beams of radiation can be directed through the flame zone by merely rotating the knob 18. If other lamps are to be substituted for those previously adjusted, the axial position of the lamps previously adjusted are marked with respect to the mounting assembly 42 so that if the lamps are to be subsequently used they need merely be inserted into the mounting assembly to the position previously marked and are accordingly prefocused at the same point.

What is claimed is:

1. An ignition assembly for a burner comprising:
 a piezoelectric generator responsive to a force applied thereto for generating a high voltage;
 electrical spark generating means electrically coupled to said piezoelectric generator;
 a burner formed with an output opening for directing a combustible gas toward a flame zone;
 movable mounting means including an elongated member having said spark generating means mounted on one end and pivotally mounted at the other end for movement into said flame zone and away from said flame zone and a stop member for limiting the travel of said movable mounting assembly;
 means for applying a force to said piezoelectric generator, including a rotating shaft, and
 coupling means including spring means coupling said means for applying said force to said generator to said movable mounting means so that when a force is initially applied to said generator said spark generating means moves into said flame zone to the limit of its travel while said piezoelectric generator generates a high voltage to ignite said gas, remaining at the limit while the shaft is rotated further to continue to generate a high voltage, and when said force is released said spark generating means moves away from said flame zone.

2. An ignition assembly as defined in claim 1 including:
 mounting means for said burner for adjusting the vertical position of said burner, and
 wherein said movable mounting assembly is pivotally mounted to said burner mounting means so that said spark generating means movement remains at a substantially fixed relation with said burner output opening over the range of movement of said burner.

3. An ignition assembly for a burner comprising:
a piezoelectric generator responsive to a force applied thereto for generating a high voltage;
electrical spark generating means electrically coupled to said piezoelectric generator;
a burner formed with an output opening for directing a combustible gas toward a flame zone;
adjustable mounting means for said burner for adjusting the vertical position of said burner;
movable mounting means mounting said spark generating means to said adjustable mounting means for movement into and away from said flame zone over the range of vertical movement of said burner;
lever means having a range of movement for applying a force to said piezoelectric generator;
coupling means including a spring device coupled between said movable mounting means and lever means so that for a first range of movement of said lever means said spark generating means moves into said flame zone while said piezoelectric generator generates said high voltage and for a second range of movement of said lever means said spark generating means remains in said flame zone while said piezoelectric generator generates said high voltage, and spring means coupled to said movable mounting means for moving said spark generating means away from said flame zone.

4. An ignition assembly as defined in claim 3 wherein:
said movable mounting means includes an elongated member receiving said spark generating means on one end and pivotally mounted to said adjustable mounting means at the other end, and
said coupling means includes an elongated rod coupled to said spring device and is mounted for horizontal sliding movement, an arm formed with an elongated slot connected to said rod, and an extended member positioned in said slot and connected to said movable mounting means for pivoting said elongated member in response to the horizontal movement of said rod.

References Cited

UNITED STATES PATENTS

| | | | |
|---|---|---|---|
| 2,505,596 | 4/1950 | Weiler | 431—264 |
| 3,428,408 | 2/1969 | Ameyama et al. | 431—255 |

EDWARD G. FAVORS, Primary Examiner

U.S. Cl. X.R.
310—8.3; 317—79